C. VAN SILER & B. H. PURCELL.
LEER DOOR.
APPLICATION FILED NOV. 17, 1917.

1,281,426.

Patented Oct. 15, 1918.
3 SHEETS—SHEET 2.

C. VAN SILER & B. H. PURCELL.
LEER DOOR.
APPLICATION FILED NOV. 17, 1917.
1,281,426.
Patented Oct. 15, 1918.
3 SHEETS—SHEET 3.
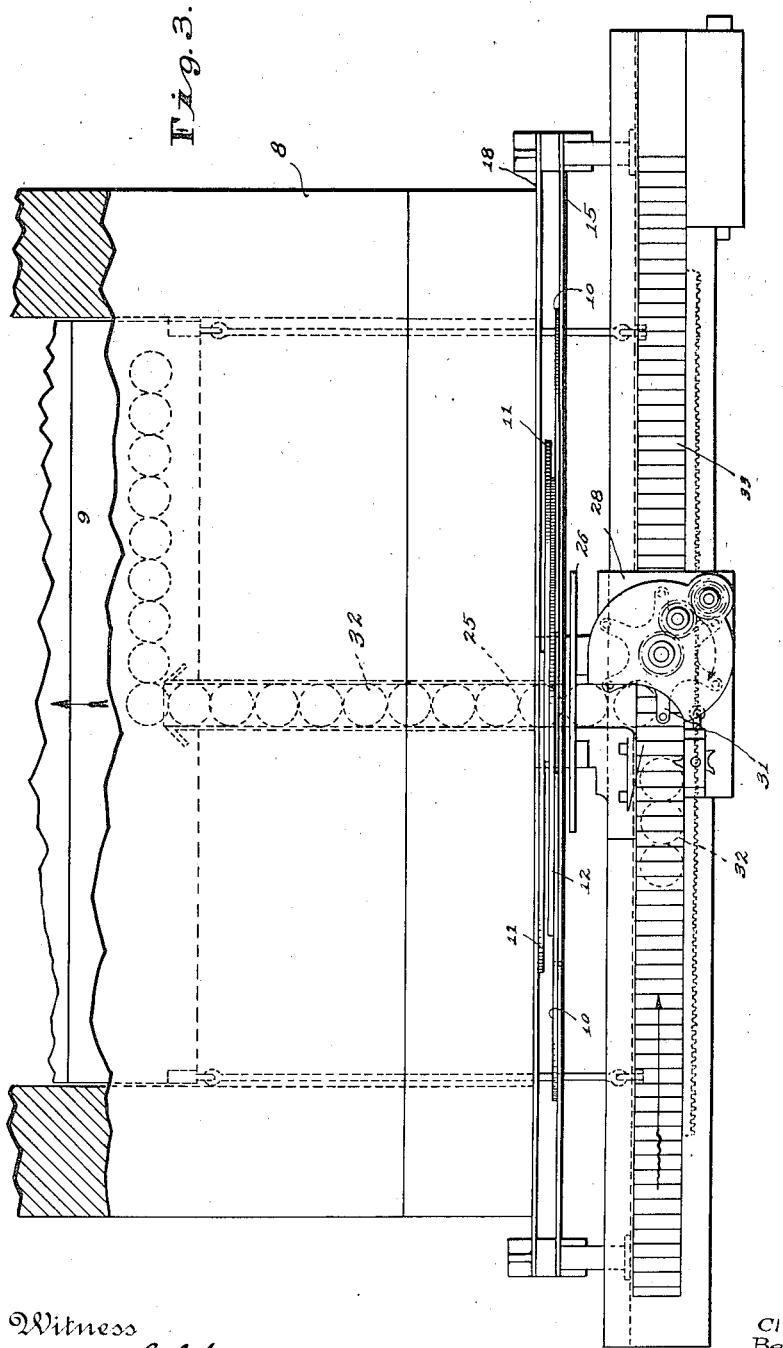
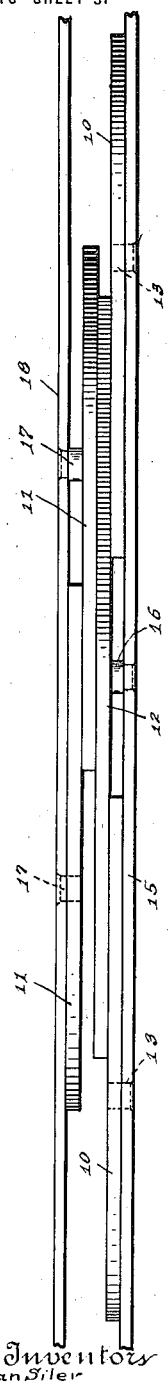
Witness
Frank A. Fahle
Inventors
Clay Van Siler
Benjamin H. Purcell,
By
Hood & Schley
Attorneys

UNITED STATES PATENT OFFICE.

CLAY VAN SILER AND BENJAMIN H. PURCELL, OF TERRE HAUTE, INDIANA, ASSIGNORS TO AUTOMATIC MACHINERY COMPANY, OF TERRE HAUTE, INDIANA, A CORPORATION OF INDIANA.

LEER-DOOR.

1,281,426. Specification of Letters Patent. Patented Oct. 15, 1918.

Application filed November 17, 1917. Serial No. 202,577.

*To all whom it may concern:*

Be it known that we, CLAY VAN SILER and BENJAMIN H. PURCELL, citizens of the United States, residing at Terre Haute, in the county of Vigo and State of Indiana, have invented a new and useful Leer-Door, of which the following is a specification.

Our invention relates to means for coöperating with an automatic leer-loading device, by means of which the mouth of the leer may be kept closed during the loading operations.

Figure 1:
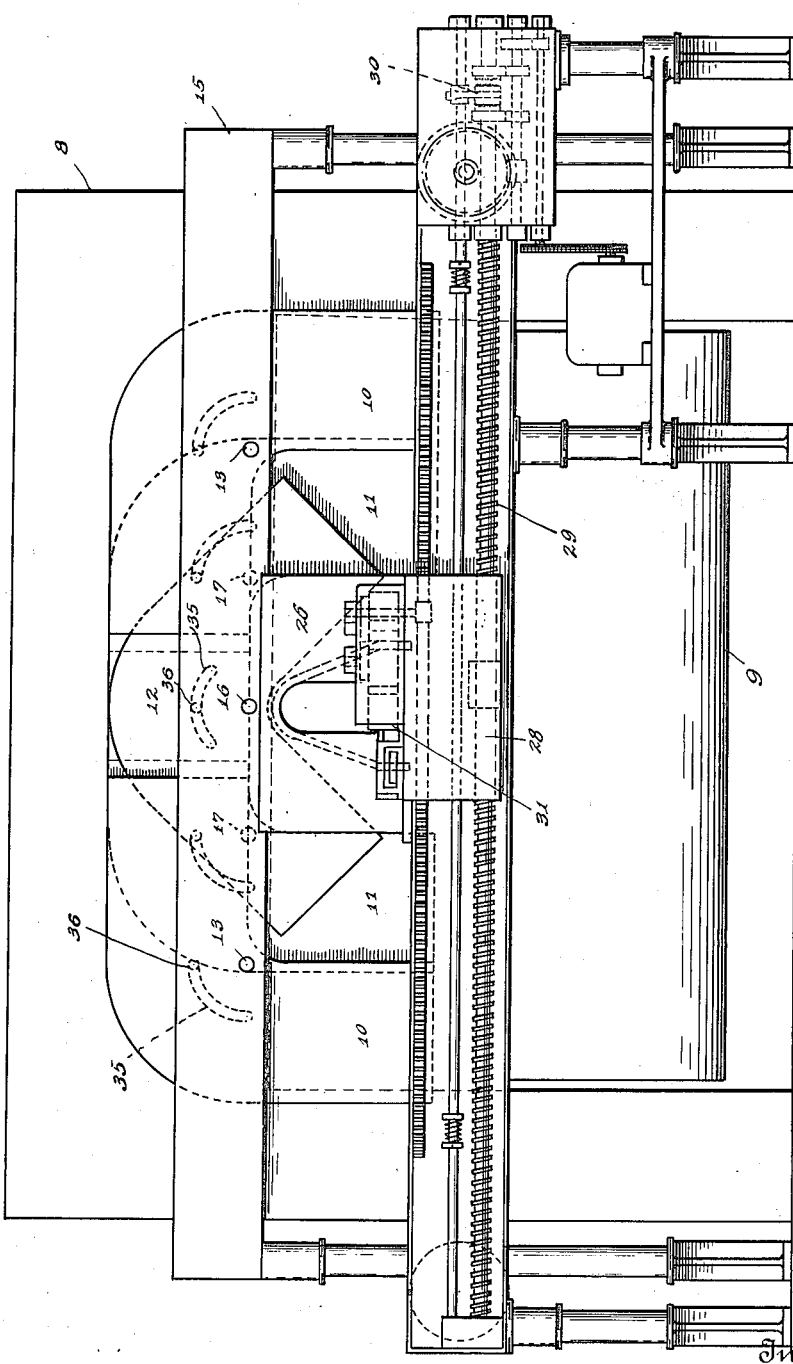
Figure 2:
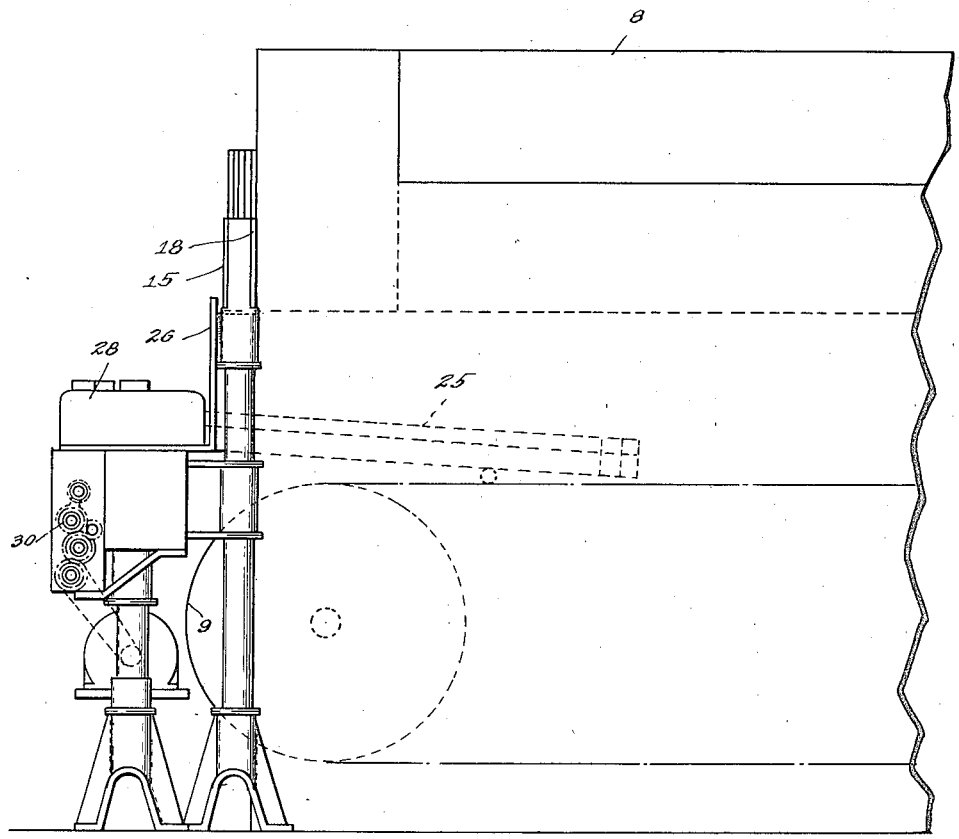

The accompanying drawings illustrate our invention. Figure 1 is a front elevation of a leer, equipped with our mouth-closing device; Fig. 2 is a side elevation; Fig. 3 a plan; and Fig. 4 a fragmentary plan with the relative thicknesses considerably exaggerated for purposes of illustration.

In the drawings, 8 indicates the leer, in which is mounted, in the usual manner, the receiving belt 9. The mouth of the leer is of the usual rectangular form and arranged to close this mouth are a series of L-shaped plates 10, 10, 11, 11, and 12, which are identical in size and shape. Plates 10, 10 are pivoted at 13, 13 at opposite ends of the mouth of the leer. These two plates 10, 10 are arranged in the same vertical plane, and their pivots 13, 13 are carried by the supporting bar 15. Plate 12 is pivotally supported at 16 in a vertical plane immediately adjacent the plane of plates 10, 10, the pivot 16 being carried by bar 15. One plate 11 is arranged in a vertical plane immediately behind the plane of plate 12, while the other plate 11 is arranged in the vertical plane immediately behind the plane of the first mentioned plate 11, and the two plates 11 are supported by pivots 17, 17 carried by a frame bar 18, which is parallel with bar 15 and is spaced therefrom a distance equal to four thicknesses of the plates 10, 11 and 12. The arrangement of the several plates 10, 11 and 12 is such that their depending arms overlap each other and close the mouth of the leer except for a space, the lateral dimension of which is a little less than the width of any one of the arms. The pivots 13, 16 and 17 are so placed that the crotch between the inner edges of the two arms of each plate will be slightly above the mouth of the leer.

Projected into the mouth of the leer is a feeding chute 25, which is adapted to engage the adjacent inner edges of the plates 10, 11 and 12. Chute 25 is designed to be moved laterally, first in one direction and then in the other, and, as it moves, it will progress into engagement with the depending arms of the cover plate and swing said depending arms forwardly and upwardly. This will cause the horizontal arms of the plate to move downwardly, so as to drop in behind the chute 25 and thus keep the mouth of the leer closed. In order to close the gap through which the chute 25 projects, said chute is provided with plate 26 which moves with it.

The precise character of means by which the chute 25 is shifted laterally, and the character of the means by which the articles for deposit in the leer are delivered to the chute, is immaterial and forms no part of our present invention. For the sake of completeness, we have illustrated somewhat generally automatic mechanism for handling the delivery chute 25. This mechanism comprises a carriage 28 which carries the chute 25 and is driven first in one direction and then in the other by a driving screw 29, controlled by reversing driving gearing 30. Carriage 28 carries a transfer wheel 31, which serves to transfer articles 32 from the delivery belt 33 to the chute 25.

In order to limit the swinging movement of the plates 10, 11 and 12, each plate is provided with an arc-shaped slot 35 receiving a stationary pin 36.

We claim as our invention:

1. The combination with a chamber having a receiving opening, of a loading member movable laterally in said opening, and a plurality of overlapping L-shaped plates arranged in a series substantially covering the opening into the chamber and coöperating with the loading member, substantially as described.

2. The combination with a chamber having a receiving opening, of a loading member arranged to traverse the receiving opening laterally, and a plurality of movable plates arranged to close the receiving opening and to successively coöperate with the loading member to be successively shifted out of and into closing positon by the lateral movement of the loading member.

3. The combination of a leer-loading member shiftable transversely and a plurality of leer-closing members successively coöperating with the loading member and movable thereby successively into and out of leer-closing position.

4. The combination with a laterally movable leer-loading member, of a plurality of pivotally supported L-shaped leer-closing members arranged to overlap each other and to be engaged by the loading member to be swung about their pivots into successive leer-closing position.

In witness whereof, we have hereunto set our hands at Terre Haute, Indiana, this 12th day of November, A. D. one thousand nine hundred and seventeen.

CLAY VAN SILER.
BENJAMIN H. PURCELL.